United States Patent [19]

Meyer et al.

[11] Patent Number: 5,878,392
[45] Date of Patent: *Mar. 2, 1999

[54] SPEECH RECOGNITION USING RECURSIVE TIME-DOMAIN HIGH-PASS FILTERING OF SPECTRAL FEATURE VECTORS

[75] Inventors: Peter Meyer, Fürth; Hans-Wilhelm Rühl, Schwaig, both of Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 863,391

[22] Filed: May 27, 1997

Related U.S. Application Data

[63] Continuation of Ser. No. 318,033, Oct. 4, 1994, abandoned, which is a continuation of Ser. No. 90,564, Jul. 12, 1993, abandoned, which is a continuation of Ser. No. 865,399, Apr. 8, 1992, abandoned.

[30] Foreign Application Priority Data

Apr. 12, 1991 [DE] Germany .......................... 41 11 995.9

[51] Int. Cl.$^6$ ...................................................... G10L 7/08
[52] U.S. Cl. ........................ 704/234; 704/231; 704/244; 704/251
[58] Field of Search .................................. 704/231, 234, 704/244, 251

[56] References Cited

U.S. PATENT DOCUMENTS

| 4,038,495 | 7/1977 | White ...................................... 179/1 SA |
| 4,736,429 | 4/1988 | Niyada et al. .......................... 704/254 |

(List continued on next page.)

OTHER PUBLICATIONS

"Das Ohr als Nachrichtenempfanger", by Prof. Dr. Eberhard Zwicker et al, S. Hirzel Verlag, Stuttgart, 1967.

Sickert, et al., "Automische Spracheingabe und Sprachowsgabe", Verlag Markt und Technik, 1983.

"Sprachverarbeitung und Sprachubertragung" by K. Fellbaum, Berlin, Springer Verlag, 1984, p. 204.

"Speaker–Dependent Connected Speech Recognition via Dynamic Programming and Statistical Methods", by Bourlard et al, pp. 117–147, Bibliotheca Phonetics, No. 12, 1985.

"The Use of One–Stage Dynamic Programming Algorithm for Connected Word Recognition",by H. Ney, IEEE Trans. on Acoustics, Speech, and Signal Proc., vol. ASSP–30, No. 2, Apr. 1984, pp. 263–271.

Verfahren fur Friesprechen, Spracherkennung und Sprachcodierung in der SPS51, by W. Armbruster et al, Philips, pp. 35–41, PKI Teck. Mitt, Jan. 1990.

(List continued on next page.)

*Primary Examiner*—David R. Hudspeth
*Assistant Examiner*—Tálivaldis Ivais Šmits

[57] ABSTRACT

A circuit arrangement for speech recognition carries out an analysis of a speech signal, extracting characteristic features. The extracted features are represented by spectral feature vectors which are compared with reference feature vectors stored for the speech signal to be recognized. The reference feature vectors are determined during a training phase in which a speech signal is recorded several times. A recognition result essentially depends on a quality of the spectral feature vectors and reference feature vectors. A recognition result essentially depends on a quality of the spectral feature vectors and reference feature vectors. A recursive high-pass filtering is performed in the time domain on the spectral feature vectors. Influences of noise signals on the recognition result are reduced by this and a high degree of speaker independence of the recognition is achieved. As a result, the circuit arrangement for speech recognition may also be used in systems requiring a speaker-independent speech recognition.

10 Claims, 2 Drawing Sheets

U.S. PATENT DOCUMENTS

| | | | |
|---|---|---|---|
| 4,809,332 | 2/1989 | Jongman et al. | 704/231 |
| 4,827,519 | 5/1989 | Fujimoto et al. | 704/250 |
| 4,833,717 | 5/1989 | Nakamura et al. | 704/206 |
| 4,897,878 | 1/1990 | Boll et al. | 704/233 |
| 4,941,178 | 7/1990 | Chung | 704/252 |
| 5,054,072 | 10/1991 | McAuley et al. | 704/207 |
| 5,056,150 | 10/1991 | Yu et al. | 704/248 |
| 5,133,012 | 7/1992 | Nitta | 704/251 |

OTHER PUBLICATIONS

Hanson et al. "Subband or Cepstral Domain Filtering for Recognition of Lombard and Channel–Distorted Speech," ICASSP '93: Acoustics Speech & Signal Processing Conference, Apr. 1993.

Hynek Hermansky and Nelson Morgan, "RASTA Processing of Speech", IEEE Transactions on Speech and Audio Processing, vol. 2, No. 4, pp. 578–589, Oct. 1994.

SPEECH RECOGNITION USING RECURSIVE TIME-DOMAIN HIGH-PASS FILTERING OF SPECTRAL FEATURE VECTORS

This application is a continuation of application Ser. No. 08/318,033 filed Oct. 4, 1994, which is a continuation of Ser. No. 08/090,564, filed Jul. 12, 1993 which is a continuation of Ser. No. 07/865,399, filed Apr. 8, 1992, all now abandoned.

BACKGROUND OF THE INVENTION

The invention relates to a circuit arrangement for speech recognition comprising an evaluation circuit for determining spectral feature vectors of time frames of a digital speech signal by means of a spectral analysis, for logarithmizing the spectral feature vectors, and for comparing the logarithimized spectral feature vectors with reference feature vectors.

Speaker-dependent speech recognition devices are used successfully in many fields, for example in systems which recognize spoken text, understand it and convert it into an action (acoustically given commands for the control of appliances), while the speech signal to be recognized is often also transmitted over a telephone line (remote control by telephone).

The book "Automatische Spracheingabe und Sprachausgabe" by K. Sickert, Haar bei München, Verlag Markt und Technik, 1983, pp. 223–230 and 322–326 deals with the construction principle of a speech recognition device in which the speech signal is first analysed in order to extract the information-carrying features. These features are represented by so-called feature vectors which are compared with reference feature vectors in a recognition unit, the reference vectors being determined during a training phase and stored in a reference memory.

The publication "Verfahren für Freisprechen, Spracherkennung und Sprachcodierung in der SPS51" by W. Armbrüster, S. Dobler and P. Mayer, PKI Technische Mitteilungen 1/1990, pp. 35–41 discloses a technical realisation of a speaker-dependent speech recognition device. During an analysis of a digital speech signal in this speech recognition device, the progression in time of this signal in the spectral range is observed and spectral feature vectors are determined which are suitable for the description of the characteristic features of the speech signal. During a learning or training phase, referred to as training hereinafter, each word to be recognized is recorded several times. Each time, spectral feature vectors are determined, from which reference feature vectors specific to a word are generated through averaging. After the training has been concluded, reference feature vectors are available for each word taught, stored in a reference sample memory. During normal operation, the test phase, the spectral feature vectors are determined for a speech signal to be recognized and supplied to a recognition unit in which a comparison with the stored reference feature vectors takes place by means of a method based on dynamic programming.

Problems in achieving a reliable recognition result occur most of all through the superimposition of interference quantities on the speech signal, for example, distortions of the frequency characteristic or quasi-stationary noise signals. Such interference quantities are mainly introduced during the transmission of the signal through a telephone line and/or through background noise during the recording. The recognition results are in addition impaired when the determination of reference feature vectors during training takes place under other recording conditions than does the determination of feature vectors during the test phase. In this case, the recognition unit cannot reliably perform the comparison between feature vectors and reference vectors any more, which results in an increase in the error percentage in the recognition.

In addition, the possibilities of using speech recognition devices are most of all restricted by the fact that the majority of the technical realisations achieved up to now are only suitable for speaker-dependent speech recognition, which implies training by the relevant user. A use of such speaker-dependent speech recognition devices in systems where the spoken texts of frequently changing users are to be recognized and/or answered (for example, fully automated information systems with spoken dialogue) is not very well possible.

SUMMARY OF THE INVENTION

The present invention, accordingly, has for its object to improve a circuit arrangement for speech recognition of the kind mentioned in the opening paragraph in such a way that a speaker-independent recognition is rendered possible and the influence of interference quantities on the recognition result is reduced.

According to the invention, the object is achieved in that a recursive high-pass filtering of the spectral feature vectors is carried out in the evaluation circuit before the comparison with the reference feature vectors.

The spectral feature vectors contain a number of components which are determined by means of numerous processing steps during a feature extraction. One of the operations to which the components are subjected is a logarithmization. Stationary or slowly changing interferences or changes in the frequency progression, which were superimposed on the speech signal to be recognized during the recording or the transmission of the speech signal, lead to additive terms in the logarithmized components of the feature vectors, which terms are suppressed by a high-pass filtering of the components of the spectral feature vectors. In addition, the application of a recursive high-pass filtering leads to a considerable improvement of the speaker-independence of the speech recognition. The circuit for speech recognition need be trained only once in the normal case now and is then capable of recognizing speech signals also when they are spoken by persons which have not trained the speech recognition circuit. The result is that an enormous application range is opened for the speech recognition circuit according to the invention. It may be used, for example, for realising a telephone information system with spoken dialogue or for controlling appliances by a spoken input, for which training of the speech recognition circuit can already be carried out by the manufacturer and thus training by the user becomes redundant. The filtering of the spectral feature vectors by a recursive high-pass which takes place before the comparison with reference feature vectors, moreover,— obviously the spectral feature vectors calculated for determining the reference feature vectors are also subjected to this filtering during the training phase—leads to a clear reduction in the influence of stationary noise signals (for example, caused by hum in a telephone connection) and to an improved suppression of frequency distortions. It should be noted here that the evaluation circuit of the circuit arrangement for speech recognition may be formed by a processor or by discrete components, as desired. In addition, one or several steps provided in the evaluation circuit may be realised by means of discrete components or as a computer program of a processor, as desired.

In an advantageous embodiment of the invention, it is provided that the recursive high-pass filtering of the evaluation circuit is carried out through calculation of high-pass filtered spectral feature vectors M(n, i) according to the equation $$M(n,i)=V(n,i)-V(n-1,i)+C \cdot M(n-1,i)$$

in which n is a time frame, V(n,i) represents the non-filtered spectral feature vectors of the time frame n, M(n-1,i) represents the spectral feature vectors of the time frame n-1, i represents a spectral component of a spectral feature vector M or V, and C is a given constant. It has been found in an investigation of several different recursive and non-recursive high-pass filterings that the suggested recursive high-pass filtering of the first order leads to the best recognition results. The quality of these recognition results also depends to a high degree on the value chosen for the constant C. It is necessary that a value in the range 0<C<1 is chosen for the constant C. Since the recursive high-pass degenerates into a differentiator for a value of C=0, while for a value C=1 only a constant portion of the components of the spectral feature vector is suppressed, it has proved advantageous to take a value of approximately 0.7 for C in order to suppress speaker-specific features in the spectral feature vectors. The recognition results clearly deteriorate in the case of too great deviations from this value.

An embodiment of the invention is so arranged that a spectral analysis to be performed in the evaluation circuit provides for a subdivision of the digital speech signal into mutually overlapping time frames, a subsequent weighting of the scan values of a time frame by means of a Hamming window, and a fast Fourier transformation with a subsequent formation of a numerical value to determine spectral feature vectors.

This means in concrete terms that a given number of scan values of the digital speech signal are joined together into blocks, called time frames hereinafter, each time. Each scan value is then present in several time frames, i.e. the time frames are shifted in time and overlap one another. The scan values of a time frame form the basis for the determination of a spectral feature vector assigned to the time frame. In the determination of the spectral feature vector, the scan values of a time frame are weighted by means of a Hamming window, as is described in, for example, the book "Automatische Spracheingabe und Sprachausgabe" by K. Sickert, Haar bei München, Verlag Markt und Technik, 1983, pp. 118–119. The scan values of each time frame are subsequently subjected to a fast Fourier transformation (FFT), and the power density spectrum is determined from the resulting spectrum through squaring and the formation of a numerical value. The spectral values of the power density spectrum of a time frame form the components of the feature vector assigned thereto.

It should be noted here that the determination of the spectral feature vectors may alternatively be effected through a filter bank analysis as is known from the book "Automatische Spracheingabe und Sprachausgabe" by K. Sickert, Haar bei München, Verlag Markt und Technik, 1983, pp. 129–131 and 324. The spectral analysis according to the invention based on the fast Fourier transformation has the advantage, in contrast to the filter bank analysis, that it can also be realised by means of a program in a processor, for example, in a signal procesor.

In a further advantageous embodiment of the invention, the evaluation circuit is so arranged that it comprises convolution centres for reducing the number of components of the spectral feature vectors by convolution. The convolution centres (centre frequencies) are so chosen that they lie at regular distances on the so-called "mel" scale (melodic curve) of the subjective musical pitch, so that a selection of components of the spectral feature vectors according to psycho-acoustical aspects is safeguarded. The nature of the "mel" scale is known, for example, from the book "Das Ohr als Nachrichtenempfanger" by E. Zwicker and R. Feldtkeller, S. Hirzel Verlag, Stuttgart, 1967.

The reduced scanning resulting from the convolution advantageously leads to a considerable reduction in the number of components of the spectral feature vectors, and thus to a clear data reduction.

A further embodiment is characterized in that a logarithmization of the spectral feature vectors to be carried out in the evaluation circuit in a spectral analysis based on the fast Fourier transformation is performed before the convolution. This leads to a companding of the components of the spectral feature vectors, resulting in a considerable reduction of the data quantity to be processed.

A reduction of the influence of interference signals, which are generally dependent on unknown characteristics of a transmission path of the speech signal, is achieved in an embodiment through an intensity standardization of the spectral feature vectors. For this purpose, an average value of the components of each spectral feature vector is calculated and subsequently subtracted from each component. The average value corresponds to an average power of a spectral feature vector and is accordingly included as a further component of a spectral feature vector. The proposed intensity standardization in addition substantially eliminates the dependence of the components on the sound volume of the speech signal which is detrimental to the recognition, and the speech recognition performance is improved.

BRIEF DESCRIPTION OF THE DRAWINGS

The invention will be described and elucidated in more detail below with reference to the embodiment diagrammatically depicted in FIGS. 1 to 3, in which.

DESCRIPTION OF THE PREFERRED EMBODIMENT

Figure 1:
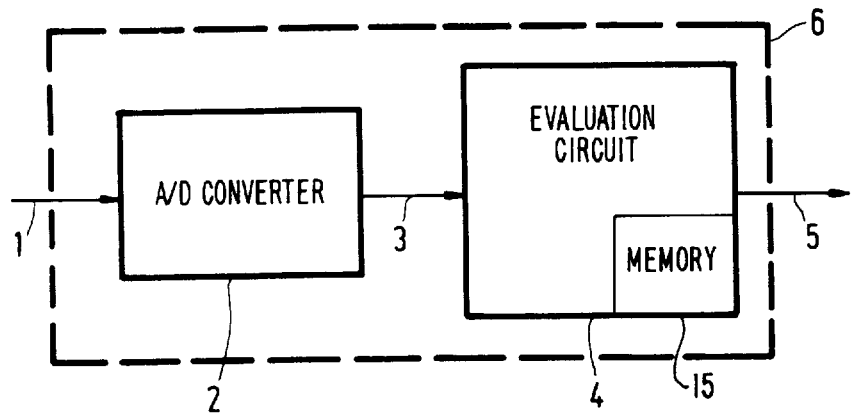
FIG. 1 shows a block diagram of a circuit arrangement for speech recognition.

FIG. 1 shows the structure of a circuit arrangement for speech recognition. An analog speech signal 1 to be recognized which is provided, for example, through a microphone or a telephone line and which lies, for example, in the frequency range from 0.3 to 3.4 kHz, is scanned by an analog-digital converter 2 with a frequency of 8 kHz and converted into a digital speech signal 3. An evaluation circuit 4, which is realised in the embodiment as a signal processor with a memory 15, determines from the digital speech signal 3 a recognition signal 5 which contains information about the words recognized in the digital speech signal 3 in a suitable data format. The recognition signal 5 forms the basis for further processing, for example, triggering of actions (control of appliances) or providing an answer through speech generation (dialogue information system).

The circuit arrangement may obviously be incorporated in any existing system in which the recognition of individual words or a continuous speech recognition is realised. An enumeration of application possibilities of a speech recognition circuit can be found, for example, in the book "Sprachverarbeitung und Sprachübertragung" by K. Fellbaum, Berlin, Springer Verlag, 1984, p. 204.

Figure 2:
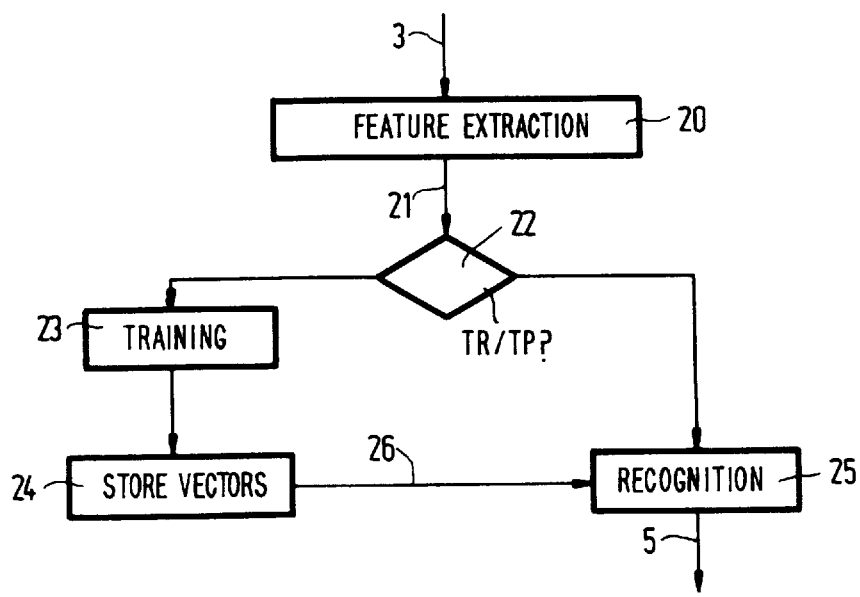
FIG. 2 shows a flowchart of the speech recognition process in the evaluation circuit of the circuit arrangement for speech recognition.

FIG. 2 clarifies the steps taken in the evaluation circuit 4 of FIG. 1 for generating the recognition signal 5 by means of a flowchart. Identical parts are given the same reference numerals here. The evaluation circuit 4 in the embodiment is formed by a signal processor with a memory which is programmed in accordance with the flowcharts of FIG. 1 and FIG. 2. Spectral feature vectors 21 are derived from the digital speech signal 3 by means of a feature extraction (block 20), the steps of which are described in detail in FIG. 3.

A decision point 22 in the evaluation circuit 4 serves to distinguish the two operational modes "training" and "test phase". Before a recognition of words of the digital speech signal 3 is possible, the circuit arrangement must first be trained during the training phase with those words which are to be recognized later during the test phase. Each word to be taught is recorded several times during training and supplied to the circuit arrangement. A feature extraction (block 20) is carried out during each recording action and the resulting spectral feature vectors 21 which are specific for the word taught are supplied to a training block (block 23). In the training block 23 a series of reference feature vectors specific for the word are formed from the feature vectors originating from several recordings in known manner, which reference feature vectors are then stored (block 24). After the training has been concluded, the memory contains for each word taught reference feature vectors which are referred to during a recognition (block 25) in the test phase.

In the test phase, as during training, a feature extraction (block 20) is carried out for the digital speech signal 3 to be recognized. The resulting spectral feature vectors 21, however, are now supplied to the recognition unit (block 25) via the decision point 22. The recognition (block 25) implies a comparison of the spectral feature vector 21 with the stored (block 24) reference feature vectors, supplying a recognition signal 5 which represents the recognition result in a suitable form and constitutes the output signal of the circuit arrangement for speech recognition.

The construction, operational procedure and principle of the training block (block 23), the storage of the reference feature vectors (block 24), and the recognition (block 25) are known from the publication "Verfahren für Freisprechen, Spracherkennung und Sprachcodierung in der SPS51" by W. Armbrüster, S. Dobler and P. Mayer, PKI Technische Mitteilungen 1/1990, pp. 35–41 and/or from the publications "The Use of a One-Stage Dynamic Programming Algorithm for Connected Word Recognition" by H. Ney, IEEE Transactions ASSP, vol. ASSP-32, no. 2, April 1984, pp. 263–271, and "Speaker-Dependent Connected-Speech Recognition via Dynamic Programming and Statistical Methods" by H. Boulard et al., in K. Kohler, Bibliotheca Phonetica, (Karger, Basel) no. 12, 1985, pp. 115–148.

Figure 3:
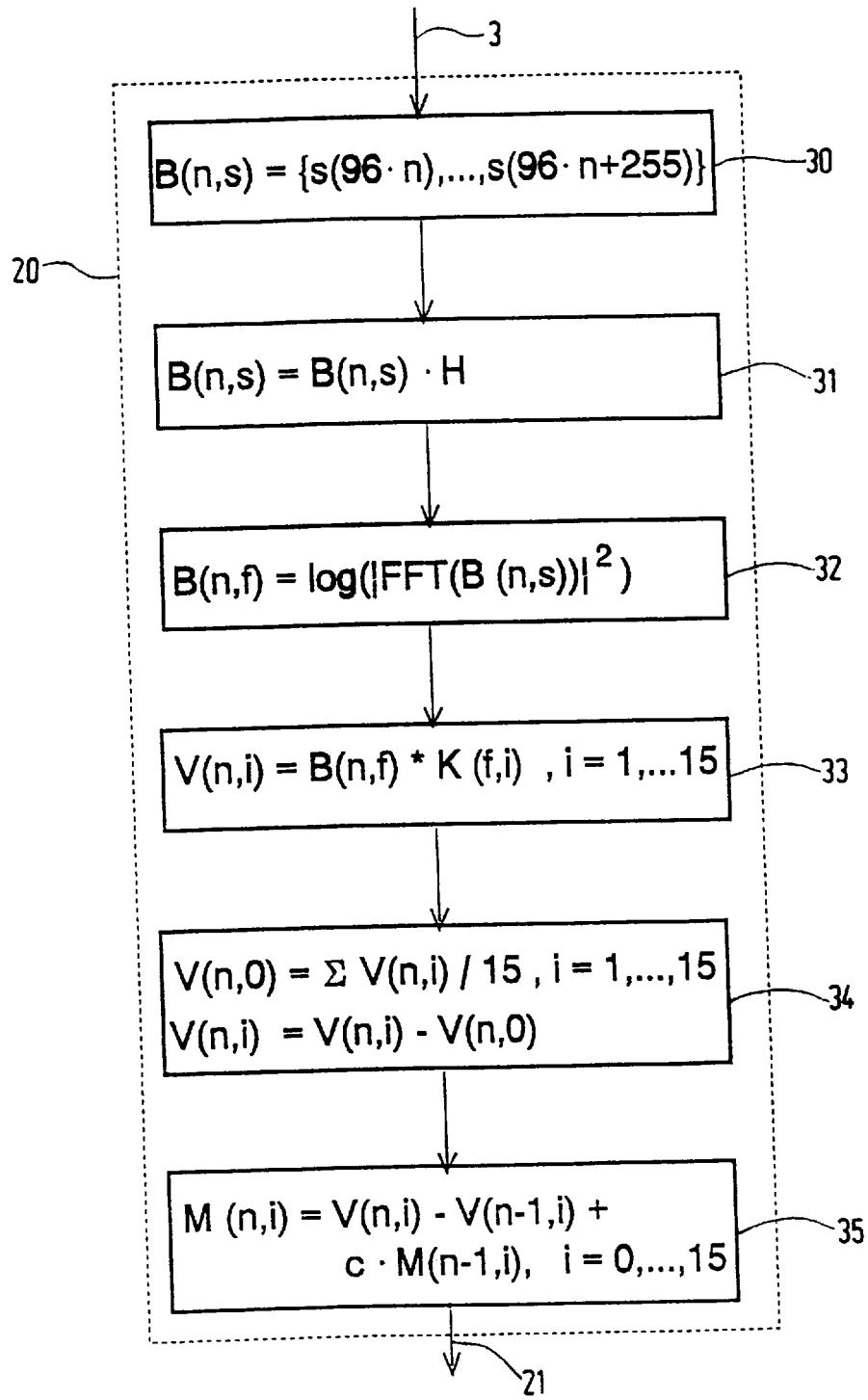
FIG. 3 shows a flowchart of the feature extraction which takes place in the evaluation circuit of the circuit arrangement for speech recognition.

FIG. 3 shows a flowchart of the feature extraction which takes place in the evaluation circuit of the circuit arrangement for speech recognition. The steps necessary for a feature extraction (see block 20, FIG. 2) as carried out in the evaluation circuit 4 of the circuit arrangement 6 for speech recognition are further explained with reference to a flowchart in FIG. 3.

The digital speech signal 3 is first subdivided into overlapping time frames which each consist of 256 scan values in accordance with the equation (block 30):

$$B(n,s)=\{s(96 \cdot n), \ldots, s(96 \cdot n+255)\}$$

in which n is a time frame, s represents the scan values of the digital speech signal 3, and B(n,s) represents the 256 scan values s belonging to one time frame n. The equation implies that each time frame n consists of 256 consecutive scan values s of the digital speech signal 3, a new time frame being formed each time after 96 scan values, so that the time frames overlap. Since the scanning takes place at a rate of 8 kHz, every 96/8000 s=12 ms a new time frame is formed, comprising 256 scan values. As block 31 shows, every time frame is then weighted with a Hamming window, as is known from, for example, the book "Automatische Spracheingabe und Sprachausgabe" by K. Sickert, Haar bei München, Verlag Markt und Technik, 1983, p. 119. For this purpose, a multiplication by a vector H which contains the coefficients of the Hamming window is carried out in accordance with $$B(n,s)=B(n,s) \cdot H$$

After weighting with the Hamming window (block 31), a logarithmized power density spectrum is determined (block 32) for each time frame n, whereby a complex spectrum of the time frame n is calculated through a fast Fourier transformation (FFT), and the power density spectra B(n,f), in which f represents the frequency, are determined therefrom through the formation of a squared numerical value. The logarithmization of the power density spectra B(n,f) results in the logarithmized power density spectra B(n,f) of the time frames. The logarithmized power density spectra B(n,f) are thus determined in accordance with $$B(n,f)=\log(|FFT(B(n,s))|^2)$$

in which B(n,s) represents the scan values of a time frame n weighted with the Hamming window and FFT symbolically indicates the fast Fourier transformation. Such a determination of the logarithmized power density spectra of the time frames is known, for example, from the publication "Verfahren für Freisprechen, Spracherkennung und Sprachcodierung in der SPS51" by W. Armbrüster, S. Dobler and P. Mayer, PKI Technische Mitteilungen 1/1990, pp. 35–41.

The resulting logarithmized power density spectra B(n,f) of the time frames each comprise 256 spectral values. Convolution of the logarithmized power density spectra of the time frames with 15 convolution centres K(f,i) in accordance with $$V(n,i)=B(n,f)*K(f,i) \text{ with } i=1, \ldots, 15$$

in which V(n,i) indicates a spectral feature vector, n is the time frame, "*" the symbol for the convolution operation, and i, a component of the spectral feature vector V(n,i) yields a spectral feature vector V(n,i) for each time frame n. The convolution centres are so chosen, as was described in the introductory passage above, that fifteen spectral values evenly distributed over the "mel" scale are extracted from the power density spectra of the time frames during the convolution, together forming the components of a spectral feature vector V(n,i). The convolution carried out in block 33 and the subsequent combination of the resulting components into a spectral feature vector V(n, i) leads to a considerable data reduction and simplifies the ensuing recognition.

As block 34 shows, the average power V(n,0) is determined for each spectral feature vector V(n,i) as follows $$V(n,0) = \Sigma V(n,i)/15 \text{ with } i=1, \ldots, 15$$

and included in the spectral feature vector V(n,i) as a component i=0. In addition, the average power V(n,0) is subtracted from each component i=1, . . . , 15 of a spectral feature vector. This corresponds to a standardization of the spectral feature vectors to the average power in accordance with:

$$V(n,i) = V(n,i) - V(n,0) \text{ with } i=1, \ldots, 15$$

A spectral feature vector V(n,i) consisting of 16 components results for each time frame.

After that, a recursive high-pass filtering is carried out for the spectral feature vectors V(n,i) according to the equation $$M(n,i) = V(n,i) - V(n-1,i) + C \cdot M(n-1,i)$$

in which M(n,i) represents the high-pass filtered spectral feature vectors, V(n-1,i) the spectral feature vectors of the time frame n-1, M(n-1,i) the high-pass filtered spectral feature vectors of the time frame n-1, and C is a given constant. A value of approximately 0.7 is chosen for the constant C. The resulting spectral feature vectors M(n,i) form the feature vectors 21 on which further processing is based.

We claim:

1. A speech recognition circuit comprising:
    scanning means for periodically scanning a speech signal to form a sequence of scan values;
    frame forming means for receiving the sequence of scan values and forming a sequence of frames, each frame having a uniform number of scan values;
    windowing means for receiving a sequence of frames and weighting each frame with a window function;
    logarithmizing means for receiving each weighted sequence of frames and generating a logarithmized power density spectrum for each frame;
    spectral feature generating means for generating a spectral feature vector from the logarithmized power density spectrum;
    discrete filtering means for performing a recursive high-pass filtering of the spectral feature vector utilizing a previously generated spectral feature vector; and
    comparison means for comparing the filtered spectral feature vector with a reference spectral feature vector and outputting a recognition signal.

2. The speech recognition circuit of claim 1, wherein the discrete filtering means performs filtering in accordance with the following relationship:

$$M(n,i) = V(n,i) - V(n-1,i) + C \, M(n-1,i),$$

wherein V(n,i) is a non-filtered spectral feature vector in the time domain, M(n,i) is filtered spectral feature vector, n represents a particular frame, i represents a spectral component of spectral feature vector M or V and C represents a constant.

3. The speech recognition circuit of claim 2, wherein C is a value in the range from about 0 to about 1.

4. The speech recognition circuit of claim 1, wherein the scanning means subdivides the speech signal into mutually overlapping time frames.

5. The speech recognition circuit of claim 4, wherein the logarithmizing means performs a fast Fourier transform on each weighted sequence.

6. The speech recognition circuit of claim 5, further including convolution means for generating the convolution of the logarithmic power density function and a convolution center K(f,i).

7. The speech recognition circuit of claim 1, further including convolution means for generating the convolution of the logarithmic power density function and a convolution center K(f,i).

8. The speech recognition circuit of claim 1, wherein the windowing means weighs each frame according to the following relationship:

$$B(n,s) = B(n,s) \cdot H;$$

wherein B(n,s) represents the scan values in one time frame n and H is a vector which contains the coefficients of a Hamming window.

9. A method of recognizing a speech signal comprising the steps:
    scanning the speech signal to form a sequence of scan values;
    forming a sequence of frames with each frame having a uniform number of scan values;
    weighing each frame with a windowing function;
    generating a logarithmized power density spectrum for each frame of scan values;
    generating a spectral feature vector for the logarithmized power density spectrum;
    recursively high pass filtering the spectral feature vector in the time domain utilizing a previously generated spectral feature vector; and
    comparing the filtered spectral feature vector with a reference spectral feature vector and outputting a recognition signal.

10. A speech recognition circuit comprising:
    a memory unit for storing a reference spectral feature vector;
    scanning means for periodically scanning a speech signal to form a sequence of scan values;
    frame forming means for receiving the sequence of scan values and forming a sequence of frames, each frame having a uniform number of scan values;
    windowing means for receiving a sequence of frames and weighting each frame with a window function;
    logarithmizing means for receiving the weighted sequence and generating a logarithmized power density spectrum corresponding to each frame;
    spectral feature generating means for generating a spectral feature vector for each frame from the logarithmized power density spectrum;
    discrete filtering means for performing a recursive high-pass filtering of the spectral feature vector in the time domain utilizing a previously generated spectral feature vector; and
    comparison means for comparing the filtered spectral feature vector with the reference spectral feature vector and outputting a recognition signal.

\* \* \* \* \*